Feb. 19, 1924.  
J. BOEKEL  
WEIGHING BALANCE  
Filed Dec. 20, 1922  
1,484,005
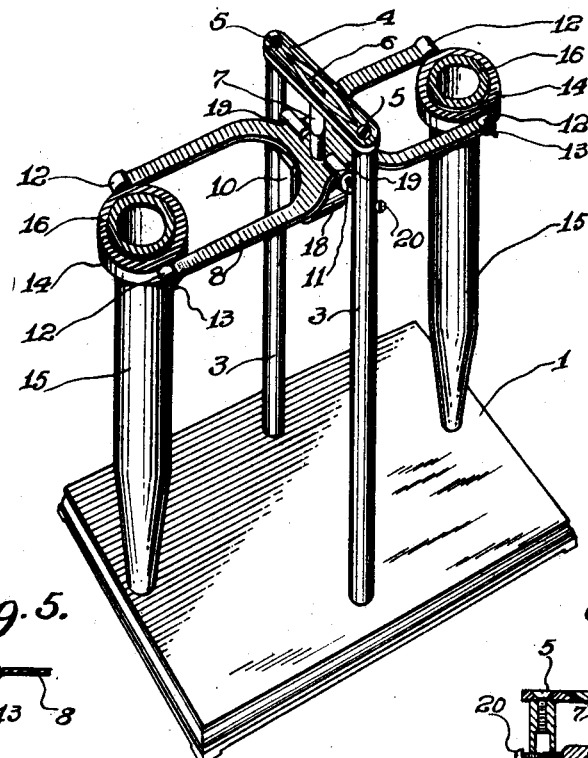
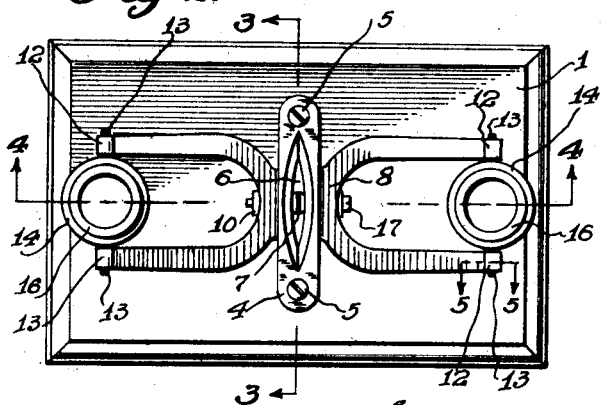
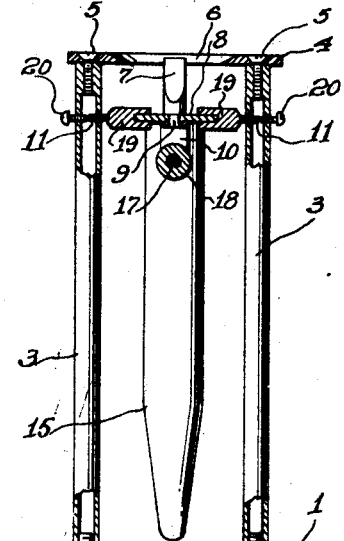
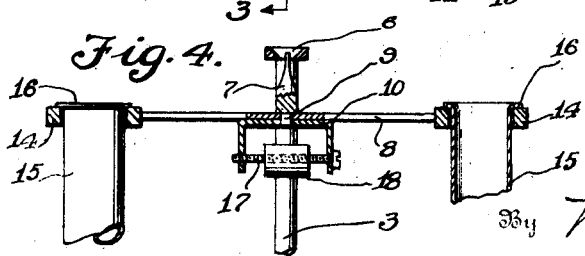
Inventor  
Julius Boekel  
By Wm. H. Babcock & Son  
Attorney Patented Feb. 19, 1924.

1,484,005

UNITED STATES PATENT OFFICE.

JULIUS BOEKEL, OF PHILADELPHIA, PENNSYLVANIA.

WEIGHING BALANCE.

Application filed December 20, 1922. Serial No. 607,952.

*To all whom it may concern:*

Be it known that I, JULIUS BOEKEL, a citizen of the United States, residing at Philadelphia, in the county of Philadelphia and State of Pennsylvania, have invented certain new and useful Improvements in Weighing Balances, of which the following is a specification.

This invention relates to weighing scales or balances and particularly to such articles especially adapted to weigh liquids and semi-solids.

The primary object of the invention is to provide such a scale or balance which will be extremely accurate, which will be capable of very delicate adjustment, and which will consist of very few and simple inexpensive parts in order that the scale or balance may be produced and sold at a very nominal figure.

The invention has been developed to meet a need for use in conjunction with centrifugal testing apparatus for testing various liquids, pus and semi-solids, such as now found in all hospitals and most doctors' offices and medical or chemical laboratories. In these tests it is the practice to use a test-tube having a certain amount of liquid or semi-solid in it to be tested and to counterbalance said test-tube and its contents by another test-tube containing an equal weight of water or of the material being tested, the two tubes being suspended on opposite sides of, and at equi-distant points from, the axis of the shaft or spindle of the testing machine. It is important that such two containers with their contents shall truly counterbalance each other in order to obtain smooth running of the testing machine. Any appreciable difference in weight between the contents of the two tubes will result in a wobbling of the shaft of the testing machine, the greater the difference, the greater the wobble. As these shafts must rotate at a very high rate of speed any such wobbling may cause an accident and in any case results in excessive wear on the bearings and shaft of the testing machine.

The above considerations have long been recognized by those most concerned and several weighing scales for the same general use as that of the present invention have been known heretofore and have functioned satisfactorily, but they have been so complicated that they have cost several times more to the user than the cost of the simpler or hand centrifugal testing machine and nearly as much as the motor driven centrifugal testing machines, the wear on which they have been intended to save, so that they have failed to come into general use and instead the approximate liquid levels have been relied on with the result that the excessive wear on the bearings due to wobbling has been accepted in the great majority of cases rather than pay the relative prohibitive cost of such scales or balance.

With the above considerations in view, the present invention consists in the details and in the combinations of parts all as hereinafter described and claimed, whereby great simplicity is obtained and whereby it is feasible to supply the above need at a figure conducive to universal use in the particular field.

In the accompanying drawings:

Figure 1 represents a perspective view of a scale or balance embodying my invention;

Figure 2, a top plan view thereof;

Figure 3, a sectional view on the line 3—3 of Fig. 2;

Figure 4, a sectional view, broken away, on the line 4—4 of Fig. 2; and

Figure 5, a fragmentary detail sectional view on the line 5—5 of Fig. 2, and on an enlarged scale.

Referring now in detail to the drawing, 1 designates a small supporting hollow or shell base 1, which may be of cast-iron and is provided with two perforations to permit the protrusion through said base 1 of the screws 2 engaging the screw-threads in the lower portions of the respective posts 3, which may be tubular as shown, and which have their upper ends rigidly connected together by a bracing and sight plate 4 having perforations registering with the bores in the upper ends of the posts 3, screws 5 being inserted in said perforations and screwed tightly into the bores of the respective posts 3, as shown. Of course the screws 2 will be screwed in tightly to draw the lower ends of the respective posts 3 tightly into engagement with the base 1, the face of said base 1 and the lower end faces of the posts 3 being such that when the said screws 2 are screwed tightly into their respective posts 3 the axes of said posts respectively will extend at right angles to the plane of the upper face of the base 1 in all directions.

The bracing sight plate 4 is provided with an elliptical opening 6 having beveled sloping walls diverging upwardly, the lower edges thereof defining the opening and serving as abutments to be engaged by, and limit the movement in either direction of, the indicator and stop 7, which is mounted on the beam 8 by means of a stem 9 extending through a perforation in the bracket 10, which is preferably welded to the under face of the beam 8 at the central portion thereof. The lower end of the stem 9 is upset or spread or riveted over to such degree as to bring the end or shoulder of the indicator and stop 7 into tight engagement with the upper face of the beam 8.

The stop or indicator 7 is so located that its axis is intersected by the common axis of the two stub-shafts 11 and has its upper portion so formed as to provide two opposed upwardly converging transverse faces spaced equi-distantly from the axis of the stop 7 and located in transverse planes at right angles to a vertical plane coincident with the longitudinal central line of said beam 8, the upper ends of said transverse faces so closely approaching each other as to leave but a narrow straight edge or surface parallel to the common axis of the two stub-shafts 11, the upper portion of the stop and indicator 7 being located between the walls of the opening 6 and preferably being of a different color of finish than the plate 4 and the posts 3 to aid vision in using the balance.

The beam 8 comprises a thin sheet metal plate having opposed bifurcations, the arms of each bifurcation having their outer ends bent down, up and around to form bearings 12 for shafts 13 extending from the rings 14 thus mounted for free turning and rotary movement in, and between, the arms of the respective bifurcations. The two stub-shafts 13 of each ring 14 have a common axial line which intersects the center of such ring and are preferably angular in cross section as shown in Fig. 5, to give a knife edge construction. Likewise, the fit between these stub-shafts 13 and their respective bearings 12 is a loose fit avoiding friction and providing the greatest freedom of action so that the rings 14 may at all times correctly position themselves under load during the balancing operation.

The rings 14 are for the purpose of snugly receiving cylindrical conically-tipped containers 15 which have collars 16 engaging the upper faces of said rings 14 respectively and into which is to be placed the fluid or semi-solid material to be tested, or which may receive similarly shaped containers containing the material to be tested and its counterbalancing amount of water or other material.

The bracket 10, above mentioned, has two ears in which is mounted a relatively long screw 17 in such manner as to be positively held therein, as for instance by screw-thread engagement with one or both of said ears and is so located that its axis lies in the same vertical plane as, and parallel with, the longitudinal central line of said beam 8. An adjustment weight 18 having screw-thread engagement with said screw 17 is provided in order that by rotating said weight 18 in the proper direction it may be moved longitudinally with respect to the fulcrum point of the beam 8 in order to obtain perfect balance of the beam 8 and containers 15 prior to the balancing operation of the material to be tested and its counterbalancing material.

The stub-shafts 11 are angular in cross-section to obtain a knife-edge bearing and extend in opposite directions from their respective bifurcated hubs 19 into registering bores in the inner walls of the respective posts 3 near the upper ends thereof, such bores being of such size as to loosely receive said shafts 11 and permit their unhampered turning movement therein. Screws 20 working in bores in the other sides of the respective posts 3 and registering with the above mentioned bores receiving shafts 11 serve to limit the lateral play or movement of said shafts 11 in said bores and to center said beam 8.

The hubs 19 have their bifurcated portions presented toward each other, have a common axial line, and each hub receives edgewise between its bifurcations a portion of the beam 8, said beam 8 preferably being welded to said hubs 19 in their respective bifurcated portions.

The beam 8 will preferably be of sheet metal and may well be stamped out and formed up in one operation. Likewise the bracket 10 will preferably be of sheet metal and may also be stamped out and formed up in one operation.

Of course it is to be understood that as above assembled the length of the containers 15 and the height of the fulcrum point of the beam 8 from the base 1 will be so related to each other that the lower ends of said containers 15, during the rocking of the beam 8 as well as during the exact balancing thereof, in fact at all times and under all conditions, will clear the base 1.

Obviously the construction is such that, if desired, the screws 2 and 5 may be removed, and the posts 3 moved laterally to free the stub-shafts 11, and the containers 15 removed from the rings 14, when the parts may all be packed flat, whereby the balances may be shipped knocked-down in the minimum amount of space to dealers or distributors and can thereafter be assembled in the minimum amount of time and with the aid of a single tool, a screw-driver, by the insertion of four screws without disturbing the adjustment or operation. However, this feature, while desirable, is not so important a consideration as is the consideration from which it indirectly flows, that of great simplicity and reduced cost of manufacture.

Having thus described my invention, what I claim as new and desire to secure by Letters Patent is:

1. In a weighing balance, a beam having a bifurcated portion, the arms of said bifurcation having thin end portions, said end portions being provided with registering bearings, in combination with a suspending ring adapted to receive a third element and having stub-shafts received in, and supported by, the respective bearings.

2. In a weighing balance, a beam having a bifurcated portion, the arms of said bifurcation having end portions rolled to form registering bearings, in combination with a suspending element adapted to receive a third element and having stub-shafts received in, and supported by, the respective bearings, said stub-shafts being angular in cross-section and being loosely received by said bearings.

3. In a weighing balance, a flat thin wide sheet metal beam, means having a single axial line for supporting said beam for rocking motion, a bracket secured to the underface of said beam, an adjustment weight adjustably mounted in said bracket, and an indicator and stop secured to said beam and protruding at right angles to the upper face thereof, the axial line of said stop intersecting the said single axial line of said supporting means.

4. In a weighing balance, a flat thin wide sheet metal beam, means having a single axial line for supporting said beam for rocking motion, a bracket secured to the underface of said beam, an adjustment weight adjustably mounted in said bracket, and an indicator and stop secured to said beam and protruding upwardly therefrom, said stop having a reduced extension extending through said beam and said bracket and having its lower end riveted over to hold said beam and bracket together and to maintain said stop in correct position, the axial line of said stop intersecting the center of said bracket and being at right angles to the longitudinal central line of said beam.

5. In a weighing balance, a flat wide thin sheet metal beam, means having a single axial line for supporting said beam for rocking motion, a bracket secured to the underface of said beam, an adjustment weight adjustably mounted in said bracket, and an indicator and stop secured to said beam, the central longitudinal line of said bracket lying in the same vertical plane with, and being parallel to, the central longitudinal line of said beam, and the axial line of said stop extending at right angles to, and intersecting, the said single axial line of said supporting means and the said longitudinal central lines of said beam and bracket respectively.

6. A weighing balance consisting of a frame consisting solely of a base, two spaced posts, means for rigidly connecting said posts to said base and means for rigidly connecting the upper portions of said posts, in combination with a thin flat wide beam having oppositely presented bifurcations, suspending rings mounted between, and in, the arms of the respective bifurcations and having free turning movement therein, and provided with fulcrum means having a common axial line and extending on opposite sides from said beam and received in registering bearings in the respective posts, and cylindrical tubular containers received in said rings respectively and having collars engaging the upper faces of the respective rings, whereby said containers are held suspended by said rings respectively, the relation between the length of such containers and the height of the fulcrum point of said beam from the base being such that the lower ends of said containers will at all times clear said base.

JULIUS BOEKEL.